United States Patent

[11] 3,600,559

[72] Inventor Rii Watanabe
Tagata-gun, Shizuoka-ken, Japan
[21] Appl. No. 736,474
[22] Filed June 12, 1968
[45] Patented Aug. 17, 1971
[73] Assignee Tokyo Denki Kabushiki Kaisha, (also known as Tokyo Electric Co., Ltd.) Tokyo-To, Japan

[54] DIVISION DEVICE FOR USE IN MOTOR OPERATED CALCULATORS
7 Claims, 6 Drawing Figs.

[52] U.S. Cl. ........ 235/63 F, 235/60 TN, 235/60.2
[51] Int. Cl. ........ G06c 23/00
[50] Field of Search ........ 235/63.22, 63.21, 60.2, 60

[56] References Cited

UNITED STATES PATENTS

| | | | |
|---|---|---|---|
| 2,754,052 | 7/1956 | Capellaro | 235/60 |
| 3,061,186 | 10/1962 | Gelling | 235/60.2 |
| 3,104,812 | 9/1963 | Lagomarsino | 235/63 |
| 3,315,885 | 4/1967 | Sato et al. | 235/60 |

*Primary Examiner*—Stephen J. Tomsky
*Attorneys*—Robert E. Burns and Emmanuel J. Lobato

ABSTRACT: There is provided a rod actuating a device for changing-over the calculator from subtraction state to addition state, and when the dividend becomes negative after any subtraction has been completed, the calculator is automatically changed over to addition state and said rod is brought in connection with a main driving shaft only when a lever which operates in the case of a subtraction state and another lever which operates in the state where the dividend becomes negative are both operated, whereby it is made possible to change over correctly the calculator from addition state to subtraction state and vice versa without causing reestablishment of the addition state when the calculator is once changed over to addition state.

Furthermore, a lever rotative in response to movement of a rack plate belonging to the uppermost figure and a complement-calculation lever engageable with a rack plate belonging to the first figure are provided, said former lever being engaged with said latter lever and operation of said latter lever being locked by a coupling member which operates in the case of division, whereby it is made possible to carry out division without calculating out any complement, because the complement-calculation lever is locked in the case of adding operation.

DIVISION DEVICE FOR USE IN MOTOR OPERATED CALCULATORS

BACKGROUND OF THE INVENTION

This invention relates to a division device for use in motor operated calculators and more particularly to a device for automatically changing over the calculator from addition state to subtraction state and for stopping complement-calculation.

In a motor operated calculator, in order to effect division, it is usual to carry out the division by subtracting a divisor from a dividend several times. Now, a calculating sequence for this purpose will be described in the following in connection with the case corresponding to (10 : 3).

```
 10
−30 ............ Cr signal.
+30
 −3
 −3
 −3
 −3 ............ Cr signal.
 +3
 ---
  1  TC
```

That is, after a dividend is set, a divisor and the dividend are put at the same figure place and then subtraction is carried out several times. When the dividend becomes negative, the dividend is added one time by producing a Cr signal, then the figures of the divisor are taken down by one place and at this state subtraction is carried out several times. Thus, when the dividend becomes negative, a Cr signal is produced so as to take down the figures of the divisor by one place. The above-mentioned operation is repeated.

Accordingly, in the conventional motor operated calculators of the type as described above, it is disadvantageously necessary to change over the calculation from subtraction to addition or vice versa by producing a Cr signal when the dividend becomes negative.

Furthermore, in the conventional motor operated calculators, when a number recorded in the sum gears becomes negative, figure places of said number are taken down from the uppermost figure to the lowermost figure, thereby to indicate the complement of said number. However, in the case of carrying out division, when the complement-calculation is operated, the calculator does not necessarily stop even when the dividend is fully divided by the divisor, thus causing disadvantageous continuous operation.

For example, in a case where divisional calculation such as (25050) is to be carried out, even when the number 50 is successively subtracted six times and then this number 50 is once added, the calculator does not stop, because operation adapted for complement-calculation is already carried out and this subtraction corresponds to the state in which the number recorded in the sum gears is zero and the figure places of said number have been taken down from the uppermost figure to the lowermost figure. Accordingly, figure places of the divisor are taken down by one figure, thereby to subtract the number five, but because of the minus state of the adder indication does not become plus even when said number is added, thus causing nonstop of the operation.

SUMMARY OF THE INVENTION

Accordingly, one object of this invention is to provide an improved division device for use in motor operated calculators, said device providing an advantageous operation such that when the dividend becomes negative after completion of a subtraction, the calculator is automatically brought to an addition state and a rod adapted to operate the mechanism for changing over the former subtraction state to said addition state is brought in connection with a main shaft only when both levers, one of which operates in the case of subtraction state and another of which operates in the case of negative state of the dividend, are operated. This ensures that when an addition state is once established by changeover operation, the addition state is not reestablished, thus causing accurate changeover of addition and subtraction.

A further object of this invention is to provide an improved division device for use in motor operated calculators, said device being adapted to lock a lever for calculating a complement in the case of division, thereby to carry out correct division without calculating any complement.

Briefly stated, according to this invention, the division device for use in motor operated calculators comprises a lever adapted to be operated in the subtraction state of the device, a lever adapted to be operated when the dividend has become negative, a main shaft for driving the device and connected to a driving mechanism, a rod which is coupled with said main shaft and operated only when said rod is brought in engagement with said levers and these levers are operated, and a mechanism capable of changing over the device from subtraction state to addition state when said mechanism is operated by operation of said rod.

Further, the division device for use in motor operated calculators comprises, in combination, a lever adapted to be operated in the subtraction state of the device, a lever adapted to be operated when the dividend has become negative, a main shaft for driving the device and connected to a driving mechanism, a rod which is coupled with said main shaft and operated only when said rod is brought in engagement with said levers and these levers are operated, a mechanism capable of changing over the device from subtraction state to addition state when said mechanism is operated by operation of said rod, rack plates each of which is provided with mutually confronted addition and subtraction racks, sum gears engaged, respectively, with said racks, circular discs each of which has projections and rotates together with said respective sum gear, and latches each of which has projections capable of being engaged with said projections of said respective circular disc, the number of groups consisting of said rack plate, sum gear, circular disc, and latch corresponding to the number of figure places; characterized by that there are provided a complement-computation lever which is engageable with said rack plate corresponding to the first figure place and engaged with a lever which is rotated in response to movement of said latch belonging to the uppermost figure place and a coupling member which operates in the case of division and locks the operation of said complement-computation lever.

BRIEF DESCRIPTION OF THE DRAWING

In the accompanying drawing illustrating addition-subtraction changing over device of one preferred embodiment of this invention.

DESCRIPTION OF PREFERRED EMBODIMENT

Figure 1:
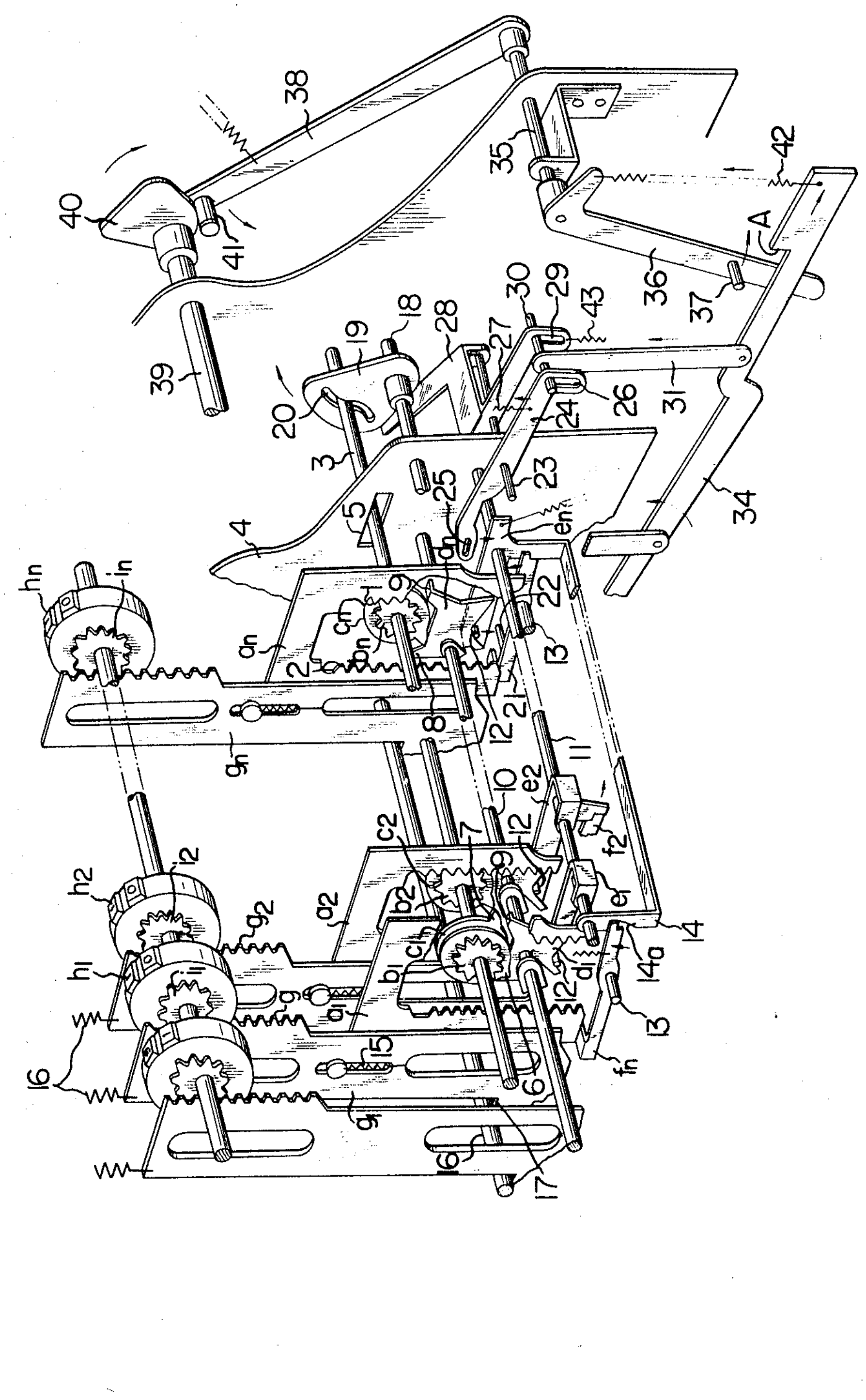
FIG. 1 is a perspective view of an addition mechanism.

Referring now to FIGS. 1, 2, 3 and 4, a plurality of rack plates $a_1, a_2, \ldots a_n$ are supported by a horizontal supporting rod not shown so as to be moved up and down, respectively, each of said rack plates being provided with an addition rack 1 and a subtraction rack 2. A shaft 3, which is passed through the space between the addition rack 1 and subtraction rack 2 and through a laterally elongated hole 5 provided in a supporting plate 4, is provided with a plurality of sum gears $b_1, b_2, \ldots\ldots b_n$ belonging, respectively, to the rack plates $a_1, a_2, \ldots\ldots a_n$, said sum gears being positioned so as to be selectively engaged with one of the racks 1 and 2, respectively. Circular discs $c_1, c_2, \ldots\ldots c_n$ having respectively projections 6 and 7 are attached to the sum gears $b_1, b_2, \ldots\ldots b_n$ and under said circular discs are disposed $x$-type latches $d_1, d_2, \ldots\ldots d_n$, each having projections 8 and 9 engageable respectively with said projections 6 and 7, supported by a horizontal shaft 10 so as to be independently rotated. There are provided levers $e_1, e_2, \ldots\ldots e_n$ which are pivotally supported by a horizontal shaft 11 and provided at their end with a pin 12 which is always urged into a peripheral recess of said latches $d_1, d_2, d_2, \ldots\ldots d_n$. One end of each of levers $f_1, f_2, \ldots\ldots f_n$ which are pivotally supported by a horizontal shaft 13 is engaged with respective ones of the levers $e_1, e_2, \ldots\ldots e_n$ and other ends of said levers $f_1, f_2, \ldots\ldots f_n$ are engaged respectively with under parts of one figure place advancing rack plate adjoining the respective rack plates $d_1, d_2, \ldots\ldots d_n$. Accordingly, when the sum gears $b$ are rotated from the indication numeral 9 to 0 in the case an addition operation and from 0 to 9 in the case of a subtraction operation, the projection 6 or 7 is engaged with the projection 8 or 9, respectively, whereby the latches $d$ are rotated, the levers $e$ are turned downward, and the levers $f$ are turned, thereby to advance the adjoining rack plates $a$ by one figure place. As a result, the sum gears being in engagement with said rack plates $a$ are rotated by one step so as to cause up- or down-shifting of one figure place. The lever $e_n$ belonging to the rack plate $a_n$ corresponding to the uppermost figure extends towards the rack plate $a_1$ corresponding to the lowermost figure. The upper part of an extended end 14 of the lever $e_n$ is connected with the shaft 11 and provided with a side recess 14$a$ with which one end of a lever $f_n$ is engaged, other end of said lever $f_n$ being engaged with under part of the rack plate $a_1$ corresponding to the lowermost figure. Accordingly, when a number recorded in the sum gears $b_1, b_2, \ldots\ldots b_n$ becomes negative, that is, when the latch $d_n$ and levers $e_n$ and $f_n$ are operated, the rack plate $a_1$ operates to rotate the gear $b_1$ by one step, thus indicating a complement. Rack plates $g_1, g_2, \ldots\ldots g_n$ are, respectively, connected with the rack plates $a_1, a_2, \ldots\ldots a_n$ by means of a spring 15. The rack plates $g_1, g_2, \ldots\ldots g_n$ are, respectively, urged upward by means of springs 15, and upper racks $g$ of said rack plates are engaged, respectively, with gears $i_1, i_2, \ldots\ldots i_n$ which are attached to respective printing drums $h_1, h_2, \ldots\ldots h_n$. The rack plates $g_1, g_2, \ldots\ldots g_n$ are provided, respectively, with shoulders 17 which are engaging with a clearing rod 16. One end of the shaft 3 provided for the sum gears $b_1, b_2, \ldots\ldots b_n$ is engaged in a guide hole 20 of a cam plate 19 for use in addition and subtraction, said cam plate 19 being pivotally supported by a shaft 18.

Since the above-mentioned mechanism is similar to those of the conventional motor-operated computers, detailed description of said mechanism is omitted here.

The shaft 13 pivotally supports a lever 21 at its middle portion The lever 21 has connected thereto a side pin 22. This pin 22 is engaged with an elongated hole 25 provided at one end of a lever 24 which is pivotally supported by the supporting plate 4 by way of a shaft 23, said lever 24 being provided at its other end with an elongated hole 26 extending vertically and with a spring 27 acting to bias said lever in the counterclockwise direction. The shaft 23 is provided with a lever 28 pivoted thereto and this lever 28 is engaged at one end with the cam plate 19 and provided at its other end with a vertically elongated hole 29 which is parallel to the hole 26. The lever 28 is biased in a clockwise direction by means of a spring 43. A horizontal shaft 30 is supported by the upper portion of a link 31 and the shaft 30 loosely extends through the elongated holes 26 and 29.

Figure 2:
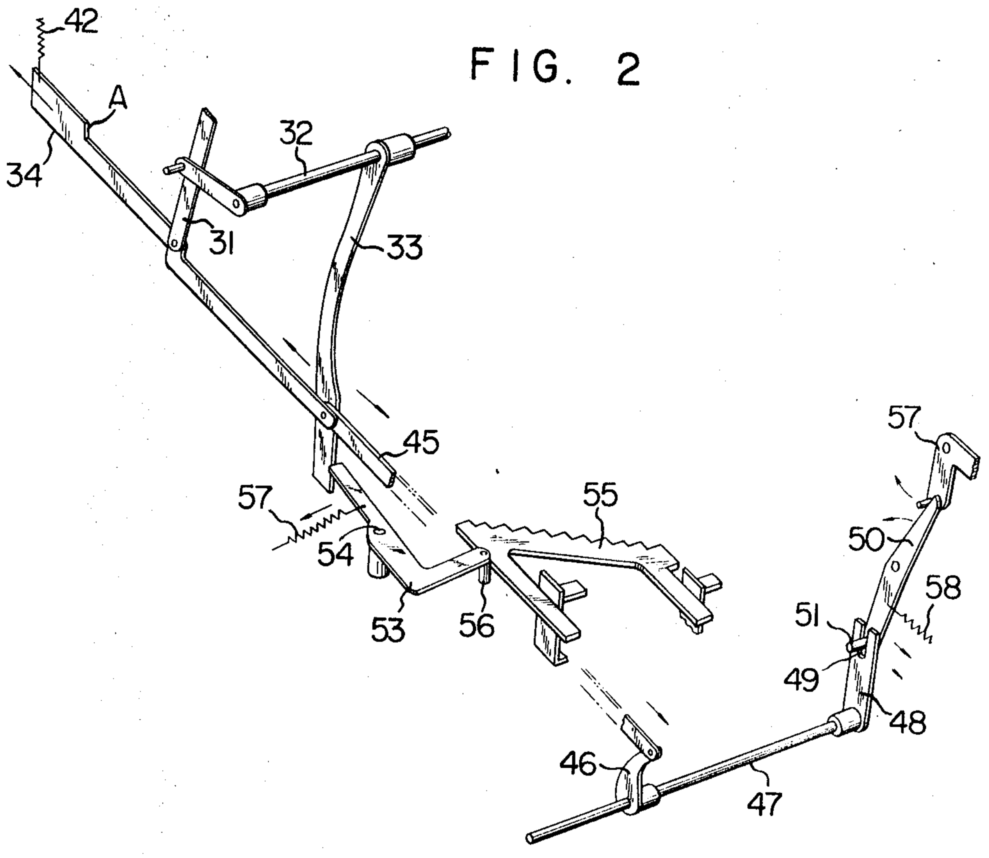
FIG. 2 is a perspective view of a device for searching figure places.

As clearly shown in FIG. 2, a rod 34 is connected to the lower end of the link 31 and a link 33 is connected at its upper end to a horizontal shaft 32. The rod 34 is engageable with a pin 37 attached to a side surface of a lever 36 which is pivotally supported by a shaft 35. A lever 38 fixed to the shaft 35 is provided with a pin 41 engaged with a cam 40 supported by a main shaft 39 which is driven by a driving mechanism which is not shown. One end of the rod 34 is biased upward by means of a spring 42. As clearly shown in FIG. 2, to said end of the rod 34 is connected one end of a rod 45 extending in the same direction as that of said rod 34 and the other end of the rod 45 is pivotally connected to an arm 46 supported by a shaft 47. This shaft 47 is provided with a forked arm 48 and a cut slot 49 is provided between the forked legs of the arm 48. A lever 50 having a pin 51 extending therefrom in sliding contact with the slot 49 is pivotally supported at its intermediate portion and engages at its upper end with a subtracting lever 57 for use in subtraction switching. The lever 50 is biased in a counterclockwise direction by means of a spring 58. There is provided a lever 53 which is releasably engaged with a lower extension of the link 33, said lever 53 being pivoted on a shaft pin 54 which is provided with a pin 56 engaged with a side edge of a figure place searching plate 55, and biased toward the direction indicated by the arrow in FIG. 2 by means of a spring 57.

The operation of the device illustrated in FIGS. 1 to 4 is as follows.

In the normal state of the device, as shown in FIG. 1, the link 34 is biased upward by the force of the spring 42 and the shaft 30 is urged against the upper edges of the elongated holes 26 and 29. Since the levers 24 and 28 take their lower positions according to their clockwise rotations, the rod 34 also takes its lower position and the shoulder A of the rod 34 is likewise in its lowermost position so as not to be engaged with the pin 37 even when the cam 40 is rotated by the main shaft 39 and the levers 38 and 36 are oscillated. Therefore the rods 34 and 45 are not operated during rotation of the main shaft 39 and the lower part of the link 33 is not moved into engagement with the lever 53.

Figures 3, 4:
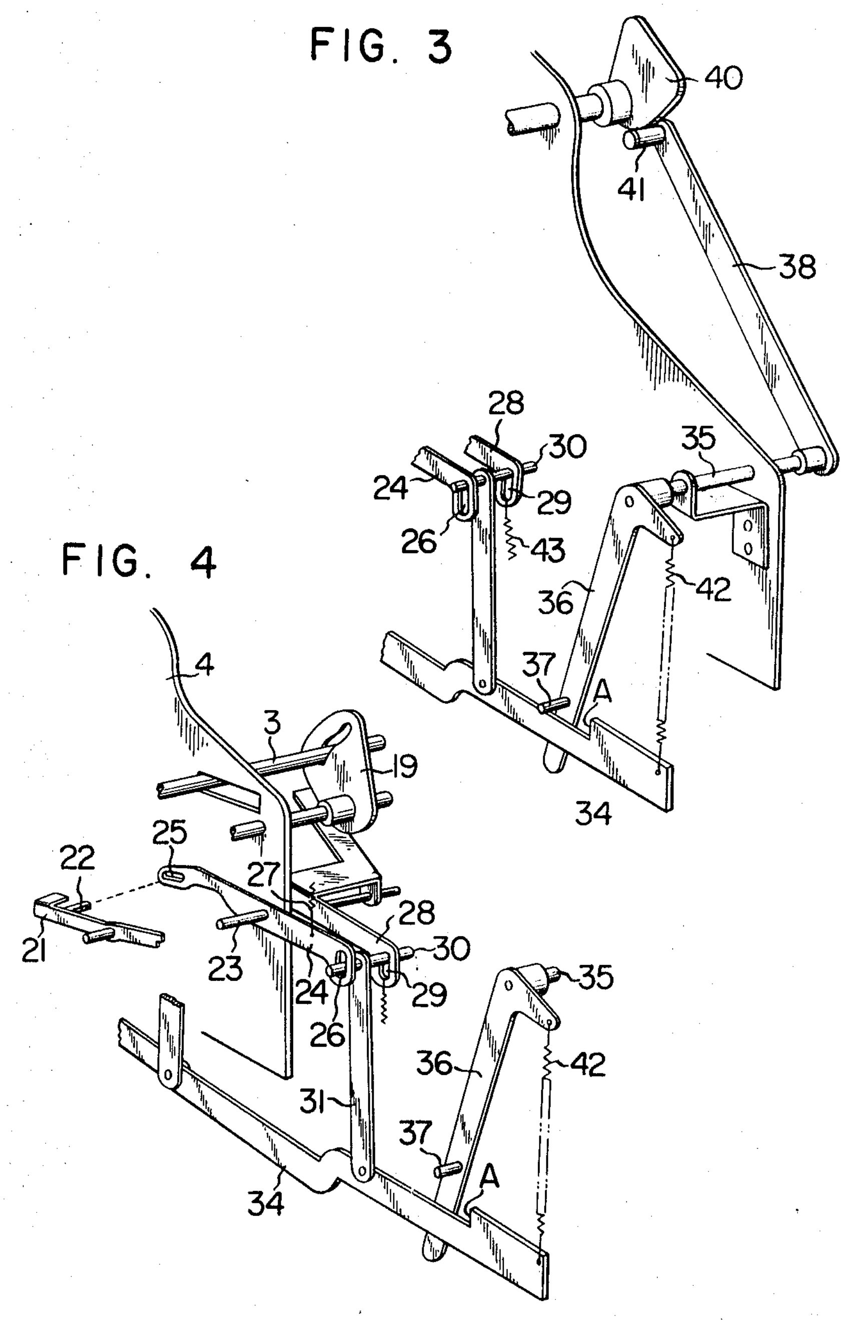
FIG. 3 is a perspective view showing the state in which the latch is operated in the case of the subtracting state of the essential part of the device.
FIG. 4 is a perspective view showing the state in which the latch is operated in the case of the adding state of said essential part.

During a subtracting operation, as viewed in FIG. 1, the cam plate 19 is rotated downward (counterclockwise) thereby moving the shaft 3 rearwardly (as seen in FIG. 2) to effect engagement of the gears $b_1, b_2, \ldots\ldots b_n$ with the subtraction rack 2 and the lever 50 is biased toward the arrow direction by means of a spring 58. On the other hand, the lever 28 is urged by the cam plate 19 so as to rotate counterclockwise, whereby the elongated hole 29 is brought upward to its upper position. Thus, when the dividend becomes negative, the latch $d_n$ is rotated, the pin 12 is pushed downward, the lever $e_n$ is rotated counterclockwise to disengage the lever 21 from the lever $e_n$, whereby the lever 21 is rotated counterclockwise by the force of a spring not shown, the pin 22 is lowered, and the lever 24 engaged with said pin 22 is rotated counterclockwise. Accordingly, the shaft 30, link 31, and rod 34 are elevated by means of the spring 42, whereby the shoulder A of the rod 34 is brought to the position capable of being engaged with the pin 37 as shown in FIG. 3.

In this condition when the lever 36 is rotated counterclockwise by rotation of the main shaft 39, the pin 37 engages the shoulder A, and the rod 34 is operated frontward as viewed in FIG. 1 (rearward as viewed in FIG. 2), whereby the lever 53 is rotated counterclockwise by means of the spring 58 and the end of the lever 53 is brought in engagement with the lower extended portion of the link 33. In this state, the subtracting lever 57 cannot operate, thus causing impossibility of any subtraction, and on the other hand the engagement between the lever 53 and the link 33 is changed over to addition operation by means of a mechanism not shown.

As described above, when the dividend becomes negative in the subtracting state, the rod 34 is operated or moved upwardly, thus causing automatic changeover from subtraction to addition.

When an addition has completed one time, the figure-place searching plate 55 operates leftward as viewed in FIG. 2 and a lever 53 is rotated clockwise through a pin 56, whereby engagement between the lever 53 and link 33 is released, thus reestablishing the subtraction state.

Furthermore, in the above-mentioned addition state, for the purpose of causing engagement of the addition rack 1 with the gears $b_1$, $b_2$, ....... $b_n$, the following states are established as shown in FIG. 4, that is, the cam plate 19 and the lever 28 have been rotated clockwise, the elongated hole 29 and the rod 34 have been brought to their lower position, and the shoulder A has been brought to its lower position where it does not engage with the pin 37. Accordingly, as described already, an adding operation, even when the latch $d_n$ is rotated, and levers $e_n$ and 21 are operated to cause counterclockwise rotation of the lever 24, thereby to elevate the elongated hole 26, the link 31 and the rod 34 are not elevated.

As a result, if an addition state is once established by changeover, the device would not be brought again to the addition state.

A complement-calculation locking device according to this invention will be described hereinbelow in connection with one embodiment illustrated in detail in FIGS. 5 and 6.

Figure 5:
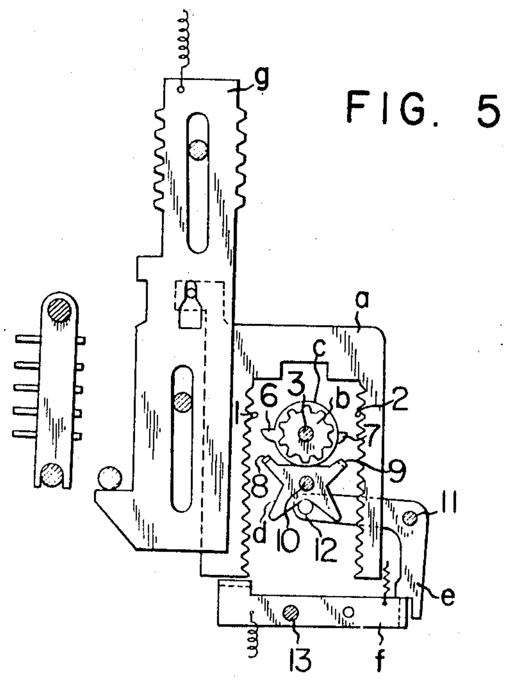
FIG. 5 is a side view of a summer or totalizer of a complement-calculation stopping device according to this invention.
Figure 6:
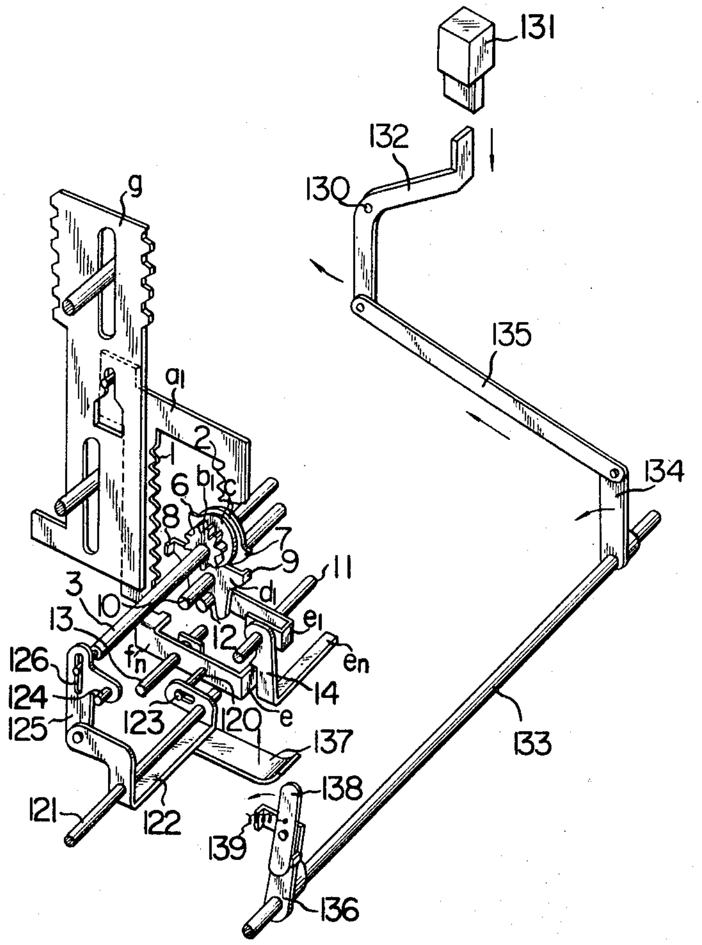
FIG. 6 is a perspective view of the essential part of said complement-calculation stopping device.

Referring to FIGS. 5 and 6, the complement-calculation lever $e_n$ is provided with a pin 120 which is loosely inserted into an elongated hole 123 provided at one end of an angle lever 122 which is pivotally supported by a shaft 121. To the other end of the angle lever 122 is connected the lower end of a lever 125 which is pivotally supported by a shaft 124. The lever 125 is provided with a vertically elongated hole 126 into which one end of the horizontal shaft 3 is inserted. A lever 132 is pivoted on a shaft 130 so that said lever 132 is rotated clockwise by pushing a division start key 131. The lower end of the lever 132 is connected by a link 135 to upper end of an arm 134 supported by a shaft 133 which is parallel to the shaft 3. A coupling member 138 capable of being releasably engaged with a lug plate 137 attached to the base of the lever 122 is pivotally connected to an arm 136 supported by the shaft 133. The coupling member 138 is biased counterclockwise by means of a spring 139.

The operation of the device illustrated in FIGS. 5 and 6 will be described. In a normal addition-subtraction calculation, when the sum value becomes negative, the indicated numeral of the sum gear $b_n$ corresponding to the uppermost figure is converted from 0 to 9 and the rockable latch $d_n$ corresponding to said figure is operated whereby the lever $e_n$ is rotated counterclockwise, the complement-calculation lever $f_n$ is rotated counterclockwise by means of a spring, the rack plate $a_1$ is lowered thereby to rotate the gear $b_1$ for one step, thus changing over the indication to complement indication.

In the case of carrying out any division, the key 131 is pressed down, whereby the lever 132 is rotated clockwise and the arm 134, shaft 133 and arm 136 are rotated counterclockwise by means of the link 135, thus causing engagement of the coupling member 138 with the undersurface of the lug plate 137. At this state, even when the sum value becomes negative and the engagement between the lever $e_n$ and the complement-calculation lever $f_n$ is released by rotation of said lever $e_n$, said lever $f_n$ is not rotated because the lug plate 137 is locked by means of the coupling member 138 so that complement-calculation is locked. That is, the pin 123 of the lever $f_n$ is locked by means of the angle lever 122 so as not be rotated.

If any division is carried out in the state where the sum value recorded in the sum gears is negative, the coupling member 138 cannot penetrate into the undersurface of the lug plate 137 even when the arm 136 is rotated counterclockwise by depressing down the key 131, because in said state the lever 122 has been rotated clockwise and the lug plate 137 is positioned at its lower position. Since as described above, the coupling member 138 cannot penetrate into the under surface of the lug plate 137, the spring 139 is extended and the coupling member 138 is racked by the end edge of the lug plate 137. However, when the apparatus is rotated by one revolution, the lever 122 and the lug plate 137 are rotated counterclockwise, whereby position of the lug plate 137 is elevated, so that the coupling member 138 is rotated counterclockwise by means of the spring 139 and engages with the undersurface of the lug plate 137, thus locking the subsequent complement-calculation.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

I claim:

1. In a calculating machine having an addition-subtraction mechanism operable in a subtraction mode to perform a subtraction operation and in an addition mode to perform an addition operation, the improvement comprising: a changeover mechanism operable to changeover said addition-subtraction mechanism from said subtraction mode to said addition mode; and actuating means for actuating said changeover mechanism when both said addition-subtraction mechanism is in said subtraction mode and a subtraction operation yields a negative number including a first pivotally mounted lever movable to a first position whenever said addition-subtraction mechanism operates in said subtraction mode, a second pivotally mounted lever movable to a first position whenever a subtraction operation yields a negative number, and linkage means connected to both of said levers by lost motion connections and responsive only to the movement of both said levers to said first position to effect actuation of said changeover mechanism.

2. A calculating machine according to claim 1; wherein said actuating means further comprises cam means for camming said first lever into said first position.

3. A calculating machine according to claim 1; wherein said lost motion connection comprises an elongated slot in each of said levers and a shaft extending through said slots in slidable contact therewith, and wherein said linkage means includes a lever connected to said shaft.

4. A calculating machine according to claim 1; including means mounting said first and second levers for pivotal movement on a common shaft.

5. A calculating machine according to claim 1; further including a complement-calculating device cooperative with said addition-subtraction mechanism to perform a complement calculation; and manually actuated means for rendering said complement-calculating device ineffective during a division calculation.

6. A division device for use in a motor-operated computer comprising: a plurality of rack plates each having an addition gear rack and a subtraction gear rack; a plurality of sum gears mounted for movement to engage alternatively with respective ones of said addition and subtraction gear racks; a pair of projections connected to each said sum gear; a plurality of movably mounted latching levers each selectively engageable with one of said pair of projections connected to each said sum gear; a first pivotally mounted lever pivotable to an actuating and nonactuating position; a second pivotally mounted lever pivotable to an actuating and nonactuating position; cam means responsive to the movement of said sum gears into engagement with said subtraction gear rack for camming said first lever into said actuating position; means for effecting movement of said second lever into said actuating position when a value in one of said sum gears becomes negative; a changeover mechanism operable to changeover said sum gears from engagement with said subtraction gear racks to engagement with said addition gear racks; and linkage means connected by lost motion connections to both said levers for actuating said changeover mechanism only when both said levers are in their respective actuating positions.

7. A division device according to claim 6; further including a complement-calculating device operable to perform a complement calculation; an actuating lever connected to said complement-calculating device operative in response to movement of one of said latching levers to actuate said complement-calculating device; and locking means for releasably locking said actuating lever against movement.